(12) United States Patent
Van Der Weijde

(10) Patent No.: US 12,214,685 B2
(45) Date of Patent: Feb. 4, 2025

(54) CHARGING INFRASTRUCTURE WITH A HEXAPOD CHARGING STATION FOR A VEHICLE

(71) Applicant: ROCSYS B. V, Rijswijk (NL)

(72) Inventor: Johannes Oosten Van Der Weijde, Delft (NL)

(73) Assignee: ROCSYS B.V., Rijswijk (NL)

( * ) Notice: Subject to any disclaimer, the term of this patent is extended or adjusted under 35 U.S.C. 154(b) by 566 days.

(21) Appl. No.: 17/603,732

(22) PCT Filed: Apr. 29, 2020

(86) PCT No.: PCT/NL2020/050266
§ 371 (c)(1),
(2) Date: Oct. 14, 2021

(87) PCT Pub. No.: WO2020/222640
PCT Pub. Date: Nov. 5, 2020

(65) Prior Publication Data
US 2022/0194246 A1 Jun. 23, 2022

(30) Foreign Application Priority Data
Apr. 29, 2019 (NL) ..................................... 2023019

(51) Int. Cl.
*B60L 53/31* (2019.01)
*B25J 9/00* (2006.01)
(Continued)

(52) U.S. Cl.
CPC ............. *B60L 53/31* (2019.02); *B25J 9/0069* (2013.01); *B25J 17/0216* (2013.01);
(Continued)

(58) Field of Classification Search
CPC .......... B60L 53/37; B60L 53/31; B60L 53/35; B60L 53/36; B60L 53/68; B25J 9/0069;
(Continued)

(56) References Cited

U.S. PATENT DOCUMENTS 6,157,162 A * 12/2000 Hayashi ................ H02J 7/0042
320/104
6,330,837 B1 12/2001 Charles
(Continued)

FOREIGN PATENT DOCUMENTS

CN 103023091 A * 4/2013 ............ B25J 13/085
CN 104141867 11/2014
(Continued)

OTHER PUBLICATIONS

Pratt Ga et al.: "Series Elastic Actuators", Proceedings of The 1995 IEEE/RSJ International Conference On Intelligent Robots and Systems. IROS 95. Human Robot Interaction and Cooperative Robots. Pittsburgh, Aug. 5-9, 1995; [Proceedings of the IEEE/RSJ International Conference On Intelligent R, Aug. 5, 1995 (Aug. 5, 1995), bladzijden. 399-406, XP000740920, DOI: 10.1109/IROS.1995. 525827 ISBN: 978-0-7803-3006-1.
(Continued)

*Primary Examiner* — Richard Isla
*Assistant Examiner* — Manuel Hernandez
(74) *Attorney, Agent, or Firm* — The Dobrusin Law Firm, PC

(57) ABSTRACT

A charging infrastructure including a charging station (1) for charging a vehicle (10) having a vehicle-side charging interface (20). The charging station (1) includes a robot (50) that carries a robot-side charging interface (100) for establishing a charging connection with the vehicle-side charging interface (20). The robot (50) includes a base frame (51), a movable carrier (60) carrying the robot-side charging inter-
(Continued)

face (100), and at least three displacement assemblies (71-76) between the base frame (51) and the movable carrier (60) that form a mechanism to move the movable carrier (60) with at least three degrees of freedom with respect to the base frame (51). The displacement assemblies (71-76) include an actuator (80) and a compliance assembly (90) in series with the actuator (80) and the robot-side charging interface for resiliently absorbing or releasing a displacement between the actuator and the robot-side charging interface over a compliance stroke or displacement angle.

19 Claims, 8 Drawing Sheets

(51) Int. Cl.
| | | |
|---|---|---|
| *B25J 17/02* | (2006.01) | |
| *B60L 53/35* | (2019.01) | |
| *B60L 53/36* | (2019.01) | |
| *B60L 53/37* | (2019.01) | |
| *B60L 53/68* | (2019.01) | |
| *H02J 7/00* | (2006.01) | |
| *B25J 19/00* | (2006.01) | |

(52) U.S. Cl.
CPC ............... *B60L 53/35* (2019.02); *B60L 53/36* (2019.02); *B60L 53/37* (2019.02); *B60L 53/68* (2019.02); *H02J 7/0042* (2013.01); *B25J 19/0091* (2013.01)

(58) Field of Classification Search
CPC ... B25J 17/0216; B25J 19/0091; H02J 7/0042
USPC ....................................................... 320/109
See application file for complete search history.

(56) References Cited

U.S. PATENT DOCUMENTS

| | | | |
|---|---|---|---|
| 7,543,779 B1* | 6/2009 | Lewis | B64G 1/646 |
| | | | 244/172.4 |
| 7,999,506 B1* | 8/2011 | Hollar | B60L 53/34 |
| | | | 320/109 |
| 8,473,131 B2* | 6/2013 | Leary | B60L 53/65 |
| | | | 320/109 |
| 9,252,584 B2* | 2/2016 | Aldrich | B60L 9/08 |
| 9,266,440 B2* | 2/2016 | Gao | B60L 53/35 |
| 9,493,087 B2* | 11/2016 | Leary | B60L 53/65 |
| 9,592,742 B1 | 3/2017 | Sosinov | |
| 9,662,995 B2* | 5/2017 | Wu | B60L 53/35 |
| 9,770,993 B2* | 9/2017 | Zhao | B60L 53/51 |
| 9,815,377 B2* | 11/2017 | Wu | B60L 53/65 |
| 11,390,180 B2* | 7/2022 | Kim | B60L 53/35 |
| 11,931,892 B2* | 3/2024 | Sun | G05B 19/423 |
| 2013/0076902 A1 | 3/2013 | Gao et al. | |
| 2014/0151947 A1 | 6/2014 | Brown et al. | |
| 2022/0153157 A1* | 5/2022 | Nam | B25J 17/0208 |

FOREIGN PATENT DOCUMENTS

| | | | | |
|---|---|---|---|---|
| DE | 102014107153 A1 * | 12/2014 | ............. | B25J 11/00 |
| EP | 0985573 A2 * | 3/2000 | ............. | B60L 53/30 |
| JP | 2000092618 A * | 3/2000 | .......... | B60L 11/1818 |
| JP | 2000092622 A * | 3/2000 | | |
| WO | WO-2020222640 A1 * | 11/2020 | .......... | B25J 17/0216 |
| WO | WO-2021167462 A2 * | 8/2021 | .......... | B25J 17/0208 |
| WO | WO-2022086320 A1 * | 4/2022 | ............. | B60L 53/16 |

OTHER PUBLICATIONS

PCT Transmittal of the International Search Report & Written Opinion dated Jun. 19, 2020, Application No. PCT/NL2020/050266.

PCT Notification of Transmittal of the International Preliminary Report on Patentability dated Oct. 28, 2020, Application No. PCT/NL2020/050266.

* cited by examiner

CHARGING INFRASTRUCTURE WITH A HEXAPOD CHARGING STATION FOR A VEHICLE

FIELD

The invention relates to a charging station for charging a vehicle, in particular an electrically powered vehicle, such as a passenger car.

BACKGROUND

Electrically powered vehicles have to be charged frequently by connecting them with a battery charger. In recent years, many attempts have been made to automate the establishment of the connection, for example by implementing a charging connector in the bottom or on the roof of the vehicle that can be engaged by electric contacts on a remote controlled arm.

A disadvantage of the known solutions is that the applied specific charging connectors require a specific infrastructure that requires approval under local legislation, whereby it cannot be used by a wide variety of vehicles or countries.

SUMMARY

It is an object of the present invention to provide a charging station in which a charging connection with a standardized vehicle-side charging interface can automatically be made.

According to a first aspect, the invention provides a charging infrastructure comprising a charging station for charging a vehicle having a vehicle-side charging interface. The charging station includes a robot that carries a robot-side charging interface for establishing a charging connection with the vehicle-side charging interface. The robot includes a base frame, a moveable carrier carrying the robot-side charging interface, and at least three displacement assemblies between the base frame and the moveable carrier that form a mechanism to move the moveable carrier with at least three degrees of freedom with respect to the base frame. The displacement assemblies include an actuator that is configured for imposing a displacement between the base frame and the moveable carrier over a displacement stroke or imposing a rotation of the moveable carrier with respect to the base frame over a displacement angle. The robot includes at least one compliance assembly in series with the actuator and the robot-side charging interface for facilitating a disengagement of the robot-side charging interface from the vehicle-side charging interface, when a position of the vehicle has changed during a charging process or for absorbing any rigid motion as imposed by the rectilinear motion of the actuator or by small movements of the vehicle. The at least one compliance assembly is configured for resiliently absorbing or releasing a displacement between the actuator and the robot-side charging interface over a compliance stroke or for resiliently absorbing or releasing a rotation of the moveable carrier with respect to the base frame over a compliance rotation, wherein the length of the compliance stroke is at least 5 millimeter, or wherein the angle of the compliance rotation is at least 1 degree, that is +/−0.5 degrees.

The charging infrastructure according to the invention comprises a charging station with a robot having a mechanism formed by the displacement assemblies to move the robot charging interface to the vehicle-side charging interface in at least three degrees of freedom. The one or more compliance assemblies allow absorbance of a portion of a displacement stroke of the actuators. This enables the movement of the robot-side charging interface in a controlled way but with compliance, which facilitates a proper engagement of the charging interfaces even when they are not properly aligned. This allows the charging interfaces to be implemented as existing, legally approved connectors.

In an embodiment the robot comprises six displacement assemblies that form a hexapod mechanism between the base frame and the moveable carrier to move the moveable carrier with six degrees of freedom.

In an embodiment each displacement assembly comprises a compliance assembly in series with an actuator, whereby compliance can be provided in the same degrees of freedom as provided by the actuators.

In an embodiment the robot comprises a compliance assembly between the robot-side charging interface and the moveable carrier.

In an embodiment the charging station comprises multiple compliance assemblies in series with an actuator and the robot-side charging interface, wherein these compliance assemblies have mutually different mechanical impedances that resiliently absorbs or releases a displacement between the actuator and the robot-side charging interface. A mechanical impedance is for example a spring stiffness. The different mechanical impedances can for example be used to compensate uneven weight distribution following from the different individual weights of the various components present in the robot.

In an embodiment the displacement assemblies are at one side connected with the base frame via a first coupling and wherein the displacement assemblies are at an opposite side connected with the moveable carrier via a second coupling, wherein the actuator is a rectilinear motion actuator in series with the compliance assembly. These displacement assemblies may form elongate legs between the base frame and the moveable carrier.

In an embodiment thereof the first coupling and/or the second coupling is a universal joint.

In an embodiment the length of the compliance stroke is at least 1% of the displacement stroke.

In an embodiment the length of the compliance stroke is at least 5% of the displacement stroke.

In an embodiment the length of the compliance stroke is at least 10% of the displacement stroke.

In an embodiment, the length of the compliance stroke is at least 50% of the displacement stroke.

In an embodiment the length of the compliance stroke is maximal 50% of the displacement stroke.

In an embodiment the length of the compliance stroke is maximal 100% of the displacement stroke.

In an embodiment the compliance assembly is biased to a defined position between the actuator and the robot-side charging interface.

In an embodiment the compliance assembly is configured for resiliently absorbing the displacement over the compliance stroke after exceeding a threshold load between the actuator and the robot-side charging interface. These features allow the determination of the distance between the base frame and the moveable carrier from the position of the actuator in each displacement assembly. From this a spatial position of the robot-side charging interface can be determined.

In an embodiment the robot-side charging interface and the vehicle-side charging interface are provided with a locking provision to lock and unlock the established charging connection as a safety provision.

In an embodiment the charging station comprises different types of robot-side charging interfaces for establishing a charging connection with different types of vehicle-side charging interfaces, whereby different vehicles with different vehicle-side charging interfaces can be charged in the same station.

In an embodiment the charging station comprises an electronic control system for controlling the operation of the charging station.

In an embodiment the electronic control system comprises an electronic controller that is connected with the actuator, wherein the electronic controller is configured for controlling the displacements imposed by the actuator. The electronic control system comprises a sensor that is connected with the electronic controller for determining a position or a movement of the actuator, for determining the compliance stroke, and/or for determining a force or load acting on the at least one compliance assembly.

In an embodiment thereof the electronic control system comprises a first sensor that is connected with the electronic controller for determining the position or movement of an actuator.

In an embodiment thereof the first sensor is attached to the actuator.

In an embodiment the electronic control system comprises an imaging detector that is connected with the electronic controller, wherein the electronic controller is configured for determining a spatial position of the vehicle-side charging interface in the charging station, and for controlling the displacements imposed by the actuators accordingly to move the robot-side charging interface towards the vehicle-side charging interface for establishing the charging connection.

In an embodiment the electronic controller is configured for detecting a compliance stroke of a compliance assembly and for controlling the displacements imposed by the actuators in response to the detection of the compliance stroke. By this control feature the actuators can for example be activated to push the robot-side charging interface with a temporarily higher force against the vehicle-side charging interface to establish the correct charging connection.

In an embodiment the electronic controller is configured for determining a collision of the robot-side charging interface based on the displacement stroke and the compliance stroke. This may be a collision with a human, wherein the electronic control system may respond by retracting all actuators.

In an embodiment the electronic controller is configured for determining a physical contact between the robot-side charging interface and the vehicle-side charging interface based on the displacement stroke and the compliance stroke.

In an embodiment the electronic controller is configured for determining a misalignment between the robot-side charging interface and the vehicle-side charging interface based on the displacement stroke and the compliance stroke.

In an embodiment the electronic controller is configured for controlling the displacements imposed by the actuators in order to at least partly correct the misalignment between the robot-side charging interface and the vehicle-side charging interface.

In an embodiment the electronic control system comprises a second sensor that is connected with the electronic controller for determining a compliance stroke or for determining a force or load acting on a compliance assembly.

In an embodiment the second sensor is attached to the compliance assembly.

In an embodiment the electronic control system comprises a third sensor between the moveable carrier and the robot-side charging interface that is connected with the electronic controller for determining a force or load acting between the robot-side charging interface and the moveable carrier.

In an embodiment the charging infrastructure comprises a computer server remote from the charging station that is connected with the electronic control system for configuration, or remote control, of the electronic controller.

According to a second aspect, the invention provides a method for charging a vehicle having a vehicle-side charging interface in a charging station of a charging infrastructure, wherein the charging station comprises a robot that carries a robot-side charging interface for establishing a charging connection with the vehicle-side charging interface, wherein the robot comprises a base frame, a moveable carrier carrying the robot-side charging interface, and at least three displacement assemblies between the base frame and the moveable carrier that form a mechanism to move the moveable carrier with at least three degrees of freedom with respect to the base frame, wherein the displacement assemblies comprise an actuator that is configured for imposing a displacement between the base frame and the moveable carrier over a displacement stroke, wherein the robot comprises at least one compliance assembly in series with an actuator and the robot-side charging interface that is configured for resiliently absorbing or releasing a displacement between the actuator and the robot-side charging interface over a compliance stroke, wherein in the method one or more of the linear actuators impose a displacement between the base frame and the moveable carrier over a displacement stroke to move the robot-side charging interface towards the vehicle-side charging interface, and wherein one or more of the compliance assemblies resiliently absorb or release a displacement between the actuator and the robot-side charging interface over a compliance stroke.

In an embodiment the length of the compliance stroke is at least 1 millimeter.

In an embodiment the length of the compliance stroke is maximal 100% of the displacement stroke.

In an embodiment the compliance assembly is configured for resiliently absorbing the displacement over the compliance stroke after exceeding a threshold load between the actuator and the robot-side charging interface, wherein in the method the moveable carrier follows the displacements as imposed by actuators until exceeding a threshold load whereby a compliance stroke is made.

In an embodiment the charging station comprises an electronic control system for controlling the operation of the charging station, wherein the electronic control system comprises an electronic controller that is connected with the actuators, wherein in the method the electronic controller controls the displacements imposed by the actuators.

In an embodiment the electronic control system comprises an imaging detector that is connected with the electronic controller, wherein in the method the electronic controller determines a spatial position of the vehicle-side charging interface in the charging station by means of the image detector and the electronic controller controls the displacements imposed by the linear actuators accordingly to move the robot-side charging interface towards the vehicle-side charging interface for establishing the charging connection.

In an embodiment the electronic controller detects a compliance stroke of a compliance assembly and controls the displacements imposed by the linear actuators in response to the detection of the compliance stroke.

In an embodiment the electronic controller determines a collision of the robot-side charging interface based on the displacement stroke and the compliance stroke.

In an embodiment the electronic controller determines a physical contact between the robot-side charging interface and the vehicle side charging interface based on the displacement stroke and the compliance stroke.

In an embodiment the electronic controller determines a misalignment between the robot-side charging interface and the vehicle-side charging interface based on the displacement stroke and the compliance stroke.

In an embodiment the electronic controller controls the displacement imposed by the linear actuators in order to at least partly correct the misalignment between the robot-side charging interface and the vehicle-side charging interface.

According to a third aspect, the invention provides a computer-readable medium having computer-executable instructions adapted to cause a charging infrastructure to perform the method according to the invention.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which.

DETAILED DESCRIPTION

Figure 1:
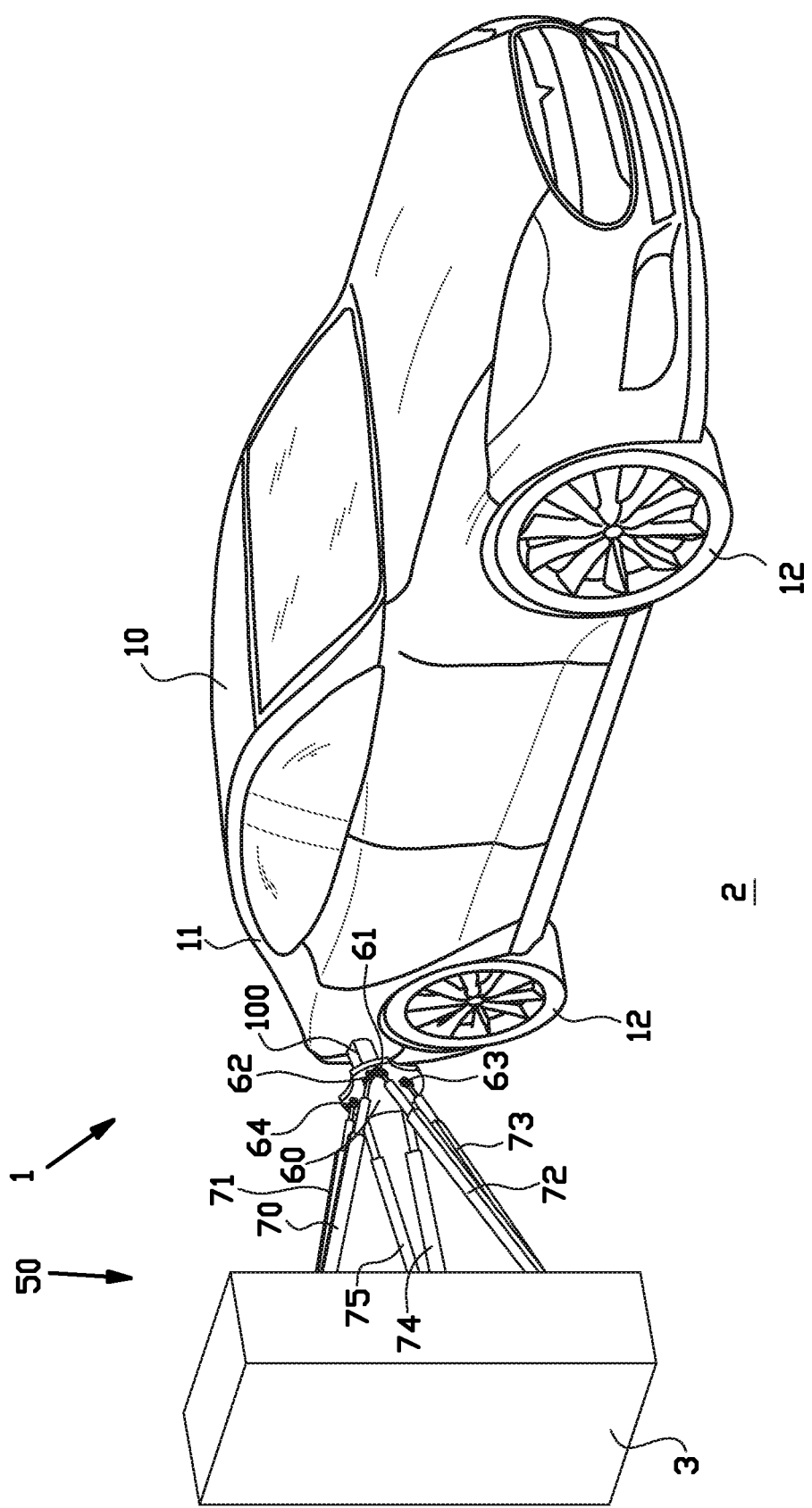
FIG. 1 is an isometric side view of a charging station with a robot according to an embodiment of the invention having a robot-side charging interface that has established a charging connection with a vehicle-side charging interface of an electrically powered vehicle.
Figure 2A:
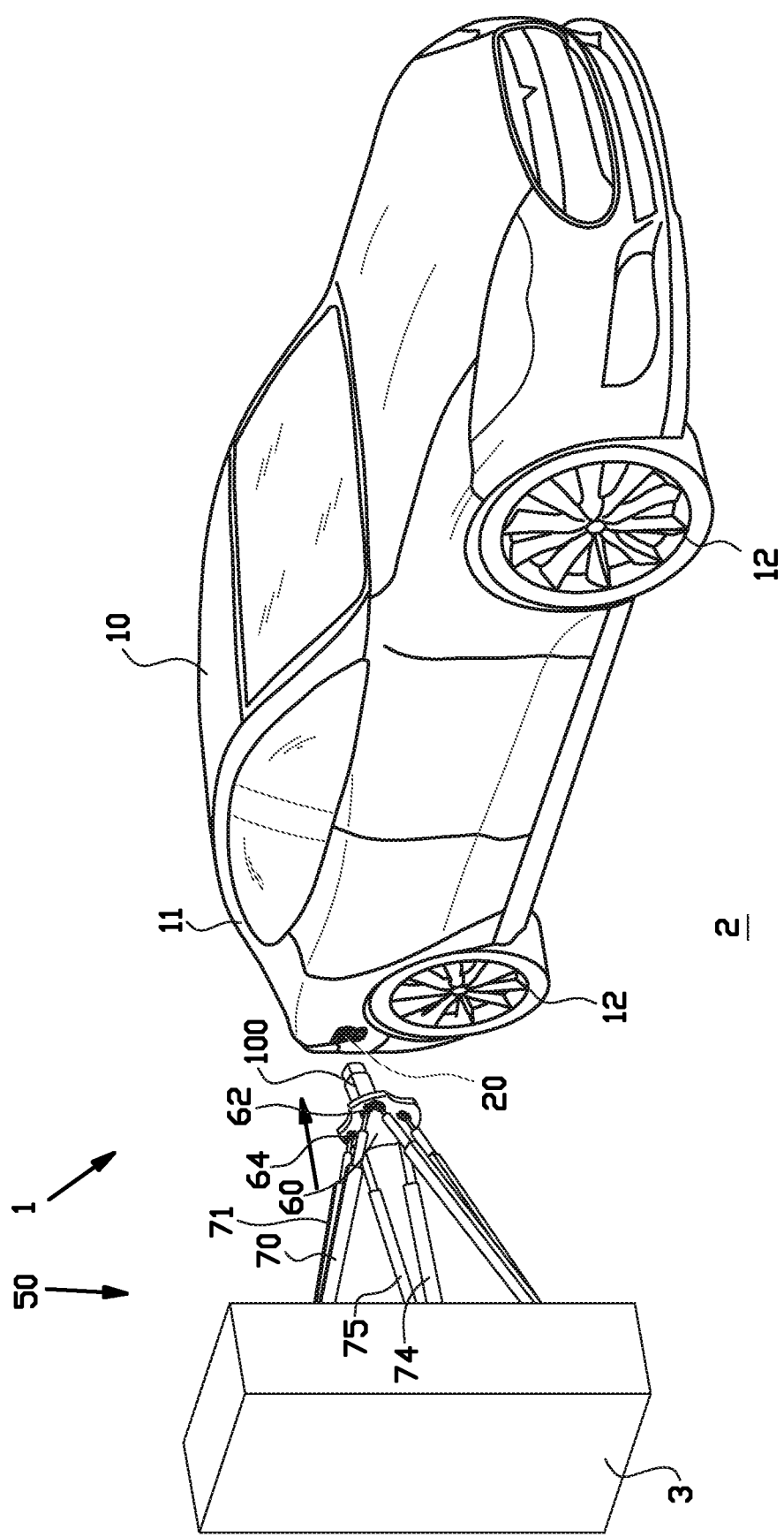
FIGS. 2A and 2B are an isometric side view and a detail of the charging station of FIG. 1, wherein the robot is in its position just before establishing the charging connection.
Figure 2B:
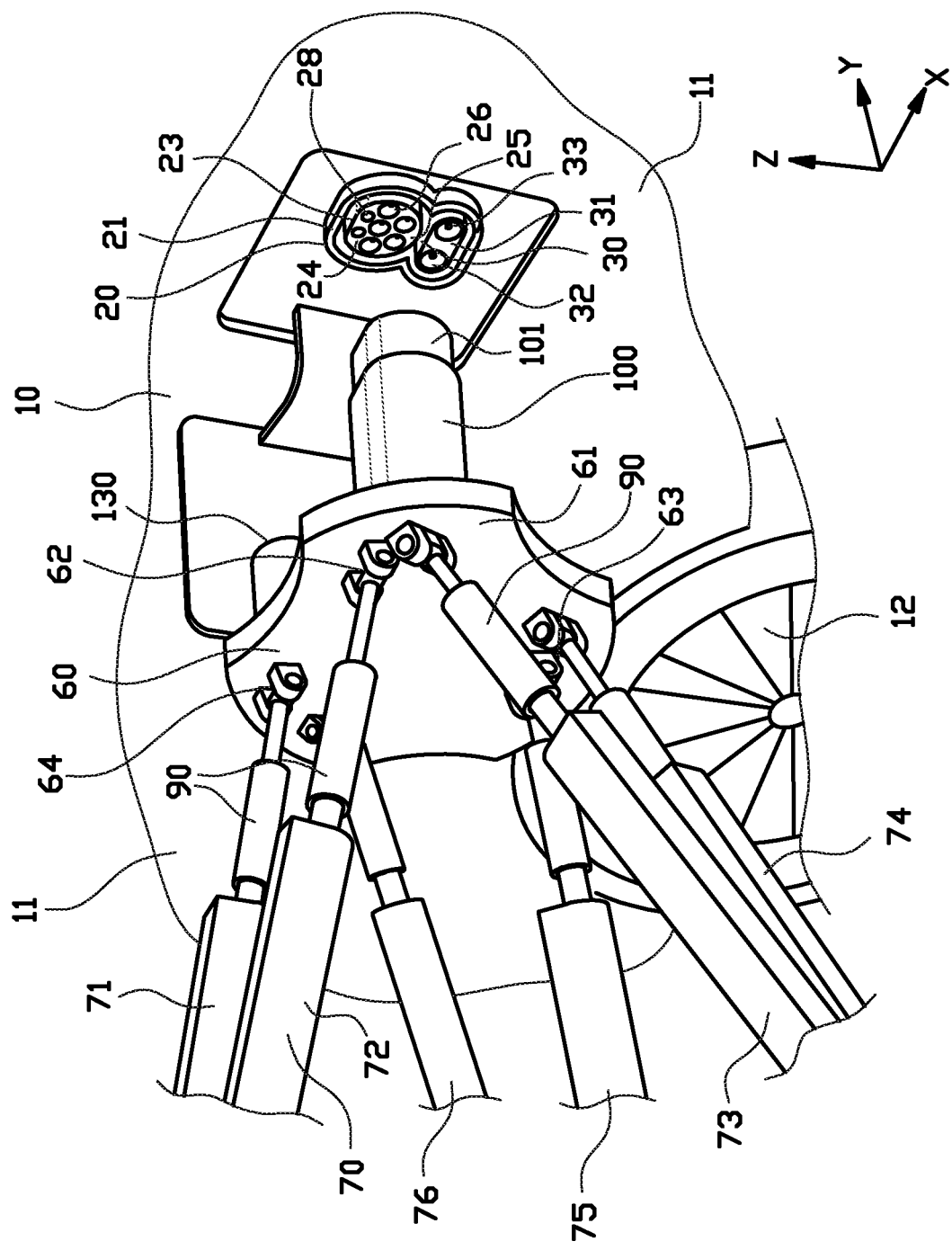

FIGS. 1, 2A and 2B show a charging station 1 with a vehicle area 2 for electrically charging an electrically powered vehicle 10, in this example a passenger car. The vehicle 10 may be fully electrically powered or it may have a hybrid drive in which an electric drive is combined with fuel combustion. The vehicle 10 has a vehicle body 11 on wheels 12 and a vehicle-side charging interface 20 carried by the vehicle body 11, in this example on the right side of the vehicle body 11 above one of the rear wheels 12.

Figure 5A:
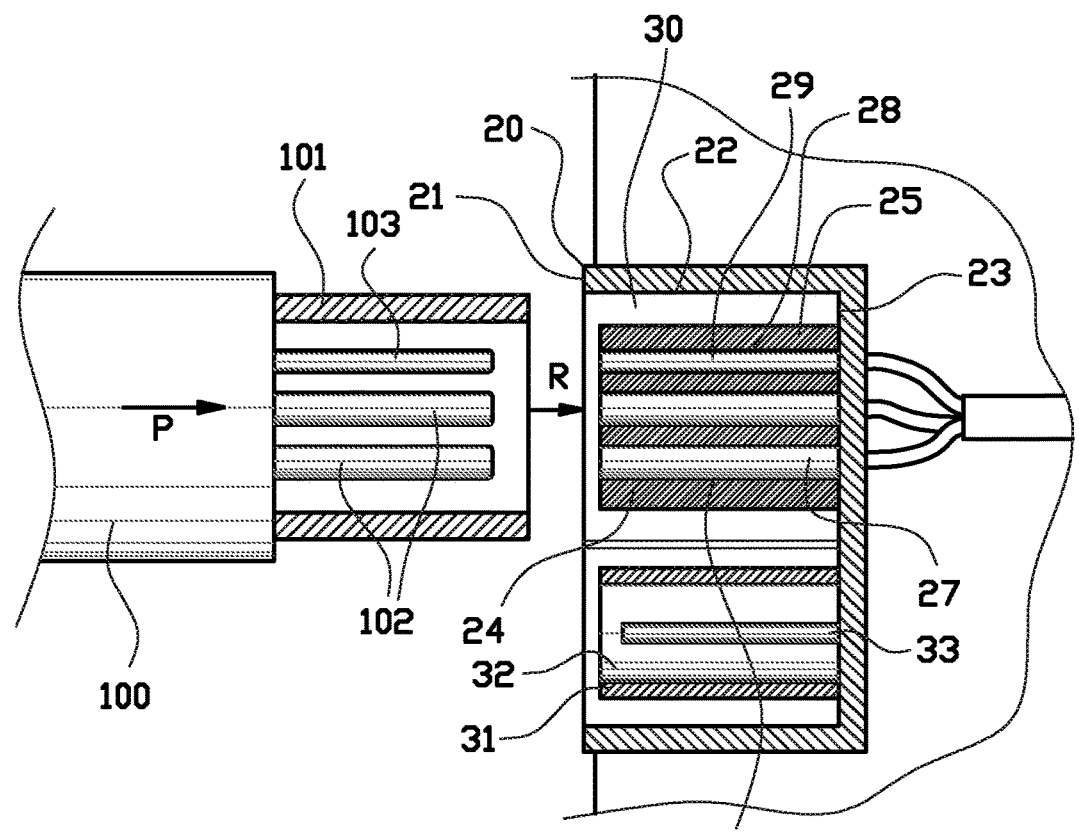
FIG. 5A is a partial cross section of the robot-side charging interface and the vehicle-side charging interface that are properly aligned just before establishing the charging connection.

The specific pinout of the vehicle-side charging interface 20 may be of any known type, such as the so called Mennekes, Yazaki, Schuko or Combo type. As shown in FIGS. 2B and 5A, the vehicle-side charging interface 20 is in this example a Combo CCS-2 inlet that accepts both normal charging and high speed charging. The vehicle-side charging interface 20 comprises a front surface 21 that merges inwardly into a circumferential inner surface 22. The inner surface 22 merges into a bottom surface 23 from which a first socket 24 and a second socket 31 project. The first socket 24 comprises a socket body 25 of electrically isolating material having five first channels 26 in which five recessed normal charging connectors 27 extend, and two second channels 28 in which in two control connectors 29 extend. The second socket 31 comprises a socket body 31 of electrically insulating material having two third channels 32 in which two high speed charging connectors 33 extend. The inner surface 21 and the socket bodies 26 together define a slot 30 around the sockets 24, 31. The slot 30, the first channels 26, the second channels 28 and the third channels 32 have a receiving direction R parallel to the first channels 26, the second channels 28 and the third channels 32.

Figure 3:
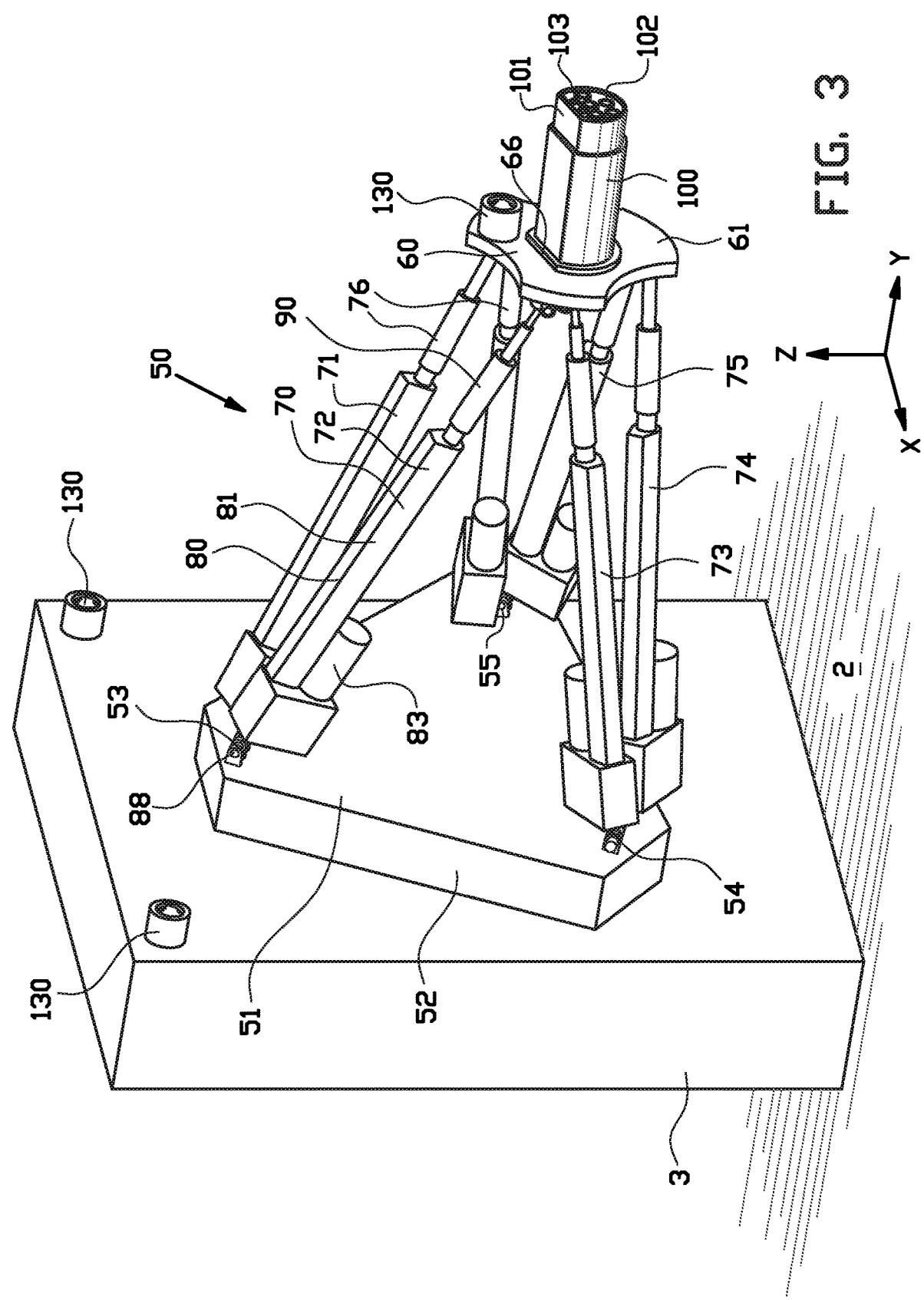
FIG. 3 is an isometric front view of the robot as shown in FIGS. 1, 2A and 2B.

As shown in FIG. 3, the charging station 1 comprises a robot 50 having a robot-side charging interface 100 for establishing a charging connection with the vehicle-side charging interface 20. The robot-side charging interface 100 is electrically connected with a not shown battery charger. The robot 50 comprises a schematically illustrated main base 51 that is in this example supported by a console 3 aside the vehicle area 2 at the side close to the vehicle-side charging interface 20. The robot 50 can be positioned at any side, or at the front side or at the back side of the vehicle 10 depending on the location of the vehicle-side charging interface 20. Alternatively the robot 50 is positioned on or under the floor to reach a vehicle-side charging interface 20 at the bottom side of the vehicle 10, or the robot 50 is suspended above the vehicle 10 to reach a vehicle-side charging interface 20 at the top side or on the roof of the vehicle 10.

The main base 51 comprises a main frame 52 and two first leg supports 53, two second leg supports 54 and two third leg support 55 on the main frame 52 that are in a same plane and that form pairs in a triangular configuration.

As best shown in FIGS. 2B and 3, the robot 50 comprises a moveable carrier 60 having a carrier frame 61 and two first leg supports 62, two second leg supports 63 and two third leg supports 64 on the carrier frame 61 that are in a same plane and that form pairs in a triangular configuration, wherein the distances between the pairs are smaller than the distances between the pairs of leg supports 53-55 of the main base 51. The carrier 60 carries the robot-side charging interface 100.

As shown in FIGS. 2B, 3 and 5A, the robot-side charging interface 100 is in this example of the so called Mennekes type (type 2 connector under IEC 62196) for normal charging. The robot-side charging interface comprises a shield 101 that mates with and fits inside the slot 30 of the vehicle-side charging interface 20, and multiple first bushes 102 and second bushes 103 that mate with and fit inside the respective first channels 26 and second channels 28 of the vehicle-side charging interface 20. The robot-side charging interface 100 comprises charging connectors that are recessed inside the bushes 102, 103 and that electrically connect with the connectors 27, 29 of the vehicle-side charging interface 20. The shield 101, the first bushes 102 and the second bushes 103 have an insert direction P parallel therewith. The insert direction P is by default perfectly parallel to and aligned with the receiving direction R of the vehicle-side charging interface 20.

The vehicle-side charging interface 20 and the robot-side charging interface 100 typically have a very precisely fitting geometry that allow at the initial mutual contact only a slight misalignment transverse to the receiving direction R of about maximal 3 millimeters, or a slight misalignment of maximal 10 degrees when manually plugged into each other. Due to the self-searching shape features of the charging interfaces 20, 100 such misalignments are automatically corrected, whereby the charging interface 20, 100 come into proper mutual engagement. The connectors 27, 29, 33 of the vehicle-side charging interfaces 20 and the connectors of the robot-side charging interface may have different lengths or positions in the insert direction P and receiving direction R to impose a default contact sequence between the mating connectors, even when they are misaligned. This ensures for example that a ground connection or a control connection is established before the power connections are made.

Figure 4:
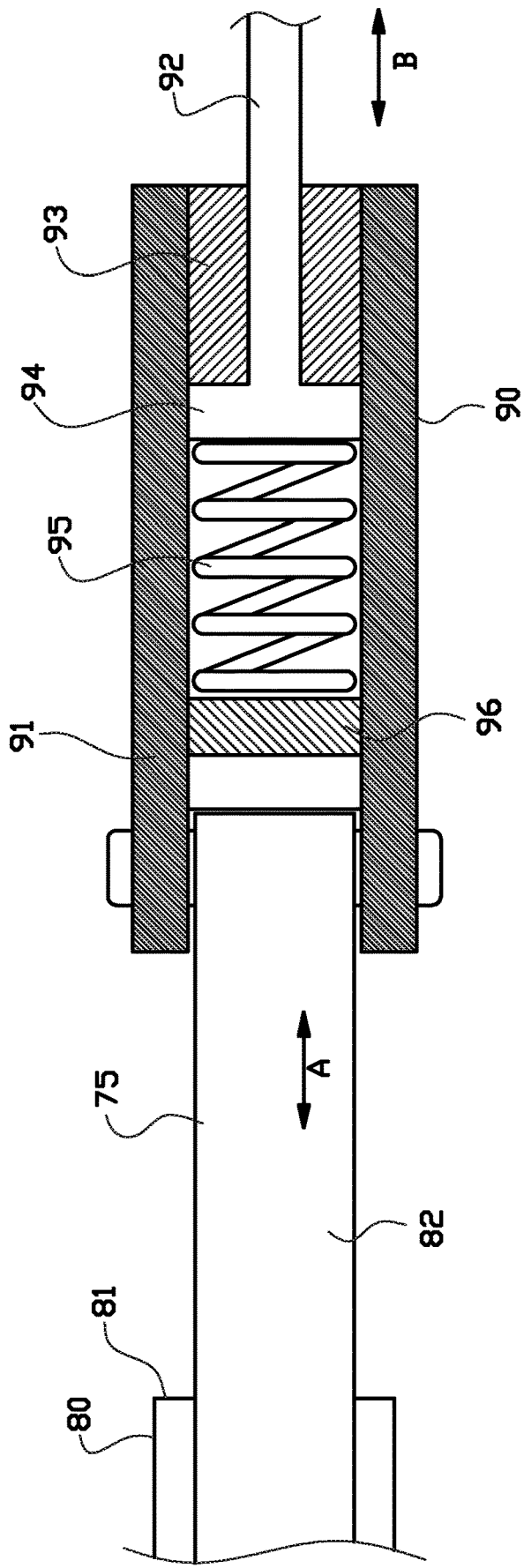
FIG. 4 is a cross section of the robot at one of its legs.

The robot 50 comprises in this example in total six displacement assemblies between the main base 51 and the moveable carrier 60 that are embodied as six legs 71-76 that extend between the leg supports 53-55 of the main base 51 and the leg supports 62-64 of the moveable carrier 60 to form a hexapod mechanism 70 between the main base 51 and the moveable carrier 60. The legs 71-76 are identical in construction and are hereafter described in detail by referring to the second leg 72. Details thereof are also shown in FIG. 4.

The second leg 72 comprises a rectilinear motion actuator 80 having an outer tube 81 that is at its bottom end connected to its leg support 53-55 of the main base 51 via a first coupling 88 that is embodied as a universal joint. The rectilinear motion actuator 80 has in this example an electric motor 83 that is mounted to the outer tube 81. The rectilinear motion actuator 80 has a drive rod 82 that is rectilinearly guided inside the outer tube 81 and that partly projects from the outer tube 81. The drive rod 82 is operatively connected with the electric motor 83, for example via a spindle. The drive rod 82 is thereby reciprocally rectilinearly moveable in direction A with respect to the first coupling 88 over a displacement stroke by powering the electric motor 83 accordingly. The rectilinear motion actuator 80 has an internal first sensor to measure the position of the drive rod 82 with respect to the outer tube 81, such as a revolution sensor or a revolution counter on the spindle. Thereby each leg 71-76 has such first sensor.

The second leg 72 comprises a compliance assembly 90 in series with the rectilinear motion actuator 80. The compliance assembly 90 comprises in this example an outer tube 91 that is mounted to the end of the drive rod 82 of the rectilinear motion actuator 80, and a connecting rod 92 that is rectilinearly guided inside the outer tube 91, in this example by means of a slide bearing 93. The connecting rod 92 partly projects from the outer tube 91 and the compliance assembly 90 comprises an end stop 94 at the end of the connecting rod 92 that remains behind the slide bearing 93 to determine a defined outermost position of the connecting rod 92 with respect to the drive rod 82, and a reversible flexible element, in this example a spring, in particular a coil spring 95 between the end stop 94 and the drive rod 82 that is biased to keep the end stop 94 in abutment with the slide bearing 93. By means of the coil spring 95 the connecting rod 92 can resiliently slide back in direction B towards the drive rod 82 over a compliance stroke when a defined threshold force is exceeded that overcomes the bias. The connecting rod 92 is at its distal end connected to its leg support 61-63 of the moveable carrier 60 via a second coupling 89 that is embodied as a universal joint.

The length of the compliance stroke is minimal 1 millimeter and maximal 100% of the maximum length of the displacement stroke of the drive rod 82.

In de described embodiment the compliance assembly 90 is biased to and against the end stop 94. Alternatively, the coil spring 95 or any other resilient element provides resilience in opposite directions with or without implementing a threshold force whereby the connecting rod 92 can resiliently be pushed towards and pulled away from the drive rod 82. The coil springs 95 in the individual legs 71-76 may have different impedances, in this example different stiffness to ensure a default position of the robot-side charging interface 100 without hanging down due to for example an uneven weight distribution following from the different individual weights of the various components present in the robot 50.

The six legs 71-76 form in this example a hexapod mechanism 70 between the main base 51 and the moveable carrier 60. Alternatively formulated the six legs 71-76 form a Stewart-platform. The rectilinear motion actuators 80 impose displacements between the first couplings 88 and second couplings 89 which are directly followed by the moveable carrier 60 as long as the threshold forces on the compliance assemblies 90 are not exceeded. The moveable carrier 60 can thereby make translations in the three orthogonal directions X, Y, Z (lateral, longitudinal and vertical) and make rotations around these axes (pitch, roll, yaw), in total six degrees of freedom (6-DOF). A part of the imposed displacements between the first couplings 88 and the second couplings 89 can be reversibly absorbed by the compliance assemblies 90 when the threshold force is exceeded.

The compliance assembly 90 has an internal second sensor 96 to measure the position of the connecting rod 92 with respect to the drive rod 82, such as a distance sensor, or a pressure sensor or force sensor to measure the pressure force that the connecting rod 92 exerts onto the drive rod 82. Thereby each leg 71-76 has such second sensor 96 whereby compliance data can be obtained that is related to the compliance between the moveable carrier 60 and the drive rods 75 at the actual position of the moveable carrier 60 as obtained with the first sensors.

This compliance comprises translations in the three orthogonal directions X, Y, Z (lateral, longitudinal and vertical) and rotations around these axes (pitch, roll, yaw), in total six degrees of freedom (6-DOF). Alternatively or in addition thereto, the moveable carrier 60 comprises a third sensor 66 between the carrier frame 61 and the robot-side charging interface 100, such as a pressure sensor matrix, to obtain or derive abovementioned compliance data in the six degrees of freedom.

The charging station 1 comprises an electronic control system for controlling the operation of the charging station 1. The control system comprises one or more imaging detectors 130, such as a video camera or multiple cameras to form a stereo camera, or distance sensors such as a LIDAR, radar or led based sensors to detect the position of the vehicle-side charging interface 20 of the vehicle in the charging station 1. The imaging detectors 130 form therefore part of a vision system. The imaging detectors 130 may be base-mounted, such as on the console 3 as shown, or be carried by the robot 50, such as on the carrier frame 61 as shown. The control system comprises an electronic controller that is connected with the electric motors 83 to power their rotation. The electronic controller is connected with the detectors 130, and with the first sensors of the linear actuators 80 and the second sensors 96 of the compliance assemblies 90 and/or with the third sensor 66 between the carrier frame 61 and the robot-side charging interface 100.

Figure 6:
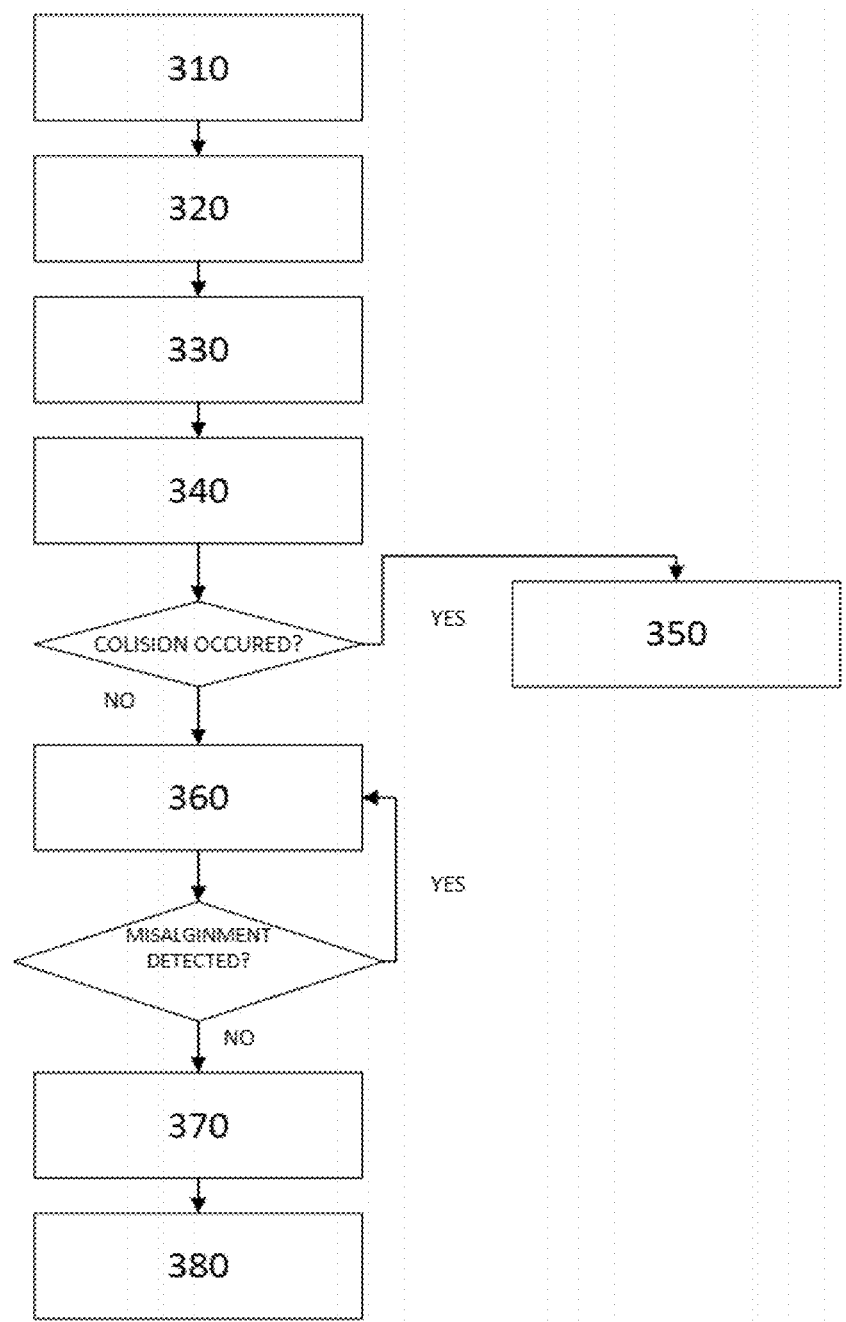
FIG. 6 shows a scheme of an operation.

The charging station forms part of a charging infrastructure having a remote computer server for communication with and for configuration of the electronic controller. The electronic controller is loaded with software that is executed by a processor of the electronic controller, whereby the charging station 1 performs the following operation as schematically indicated in FIG. 6. The explanation starts with fully retracted drive rods 82 of the legs 71-76 whereby the robot-side charging interface 100 is withdrawn from the vehicle area 2 in a standby position to allow the vehicle 10 to enter the charging station 1.

In a first step 310 the presence of a particular vehicle 10 at the vehicle area 2 is notified by means of the imaging detectors 130, or by any other appropriate sensor, or by any type of data communication between the vehicle 10 and the charging station 1, or by any type of remote trigger system, or by registration by the driver of the vehicle 10, or by a human operator on site at the charging station 1.

When the presence of the vehicle 10 is notified, then in a second step 320 the spatial position and orientation of the vehicle-side charging interface 20 in the charging station 1 are determined by means of the imaging sensors 130. This comprises the position in the three orthogonal directions X, Y, Z and any rotational orientation around these axes.

In a third step 330, the corresponding particular initial spatial position and orientation of the robot-side charging interface 100 are determined in which the robot-side charging interface 100 can be correctly inserted in direction R into the vehicle-side charging interface 20 as shown in FIG. 5A.

In a fourth step 340, the electric motors 83 are individually powered while controlling the individual positions of the drive rods 82 in direction A with the first sensors to bring the robot-side charging interface 100 in the particular initial spatial position and orientation. In this fourth step 340 the individual positions of the connecting rods 92 with respect to the drive rods 82 or any forces acting between the connecting rod 92 and the drive rod 82 are monitored by means of the second sensors 96. Alternatively or in addition thereto this can be determined with the third sensor 66. The movements are monitored with the vision system as formed with the imaging detectors 130. When any one of the connecting rods 92 is displaced towards the driving rod 75 of the same leg 71-76, it is assumed that an unexpected physical contact has occurred, for example a collision with a foreign object, such as a human, a vehicle or any other surrounding. Then in a fifth step 350 the electric motors 83 are stopped or reversed to retract the robot-side charging interface 100.

Figure 5B:
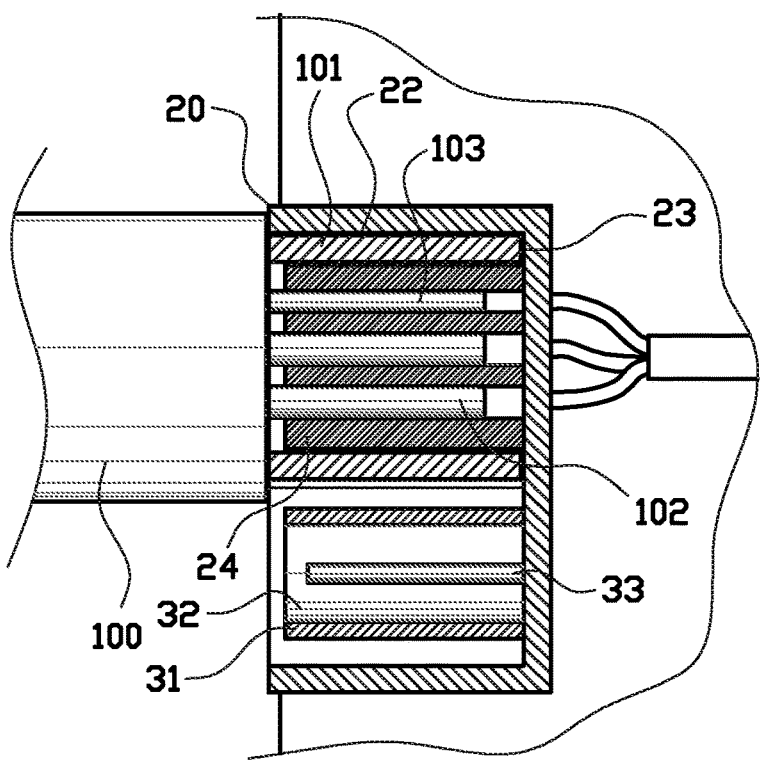
FIG. 5B is a partial cross section of the robot-side charging interface and the vehicle-side charging interface that have properly established the charging connection.

When no collision has occurred, then in a sixth step 360 following the fourth step 340, the electric motors 83 are powered while controlling the positions of the drive rods 82 in direction A with the first sensors to push the robot-side charging interface 100 into the vehicle-side charging interface 20. In the sixth step 360 the positions of the connecting rods 92 with respect to the drive rods 75 are monitored by means of the second sensors 96 or determined by means of the third sensor 66 to execute three functions:

The first function is the determination of the proper final engagement position of the robot-side charging interface 100 with respect to the vehicle-side charging interface 20 as shown in FIG. 5B. The final engagement is obtained by exercising a pushing force in the insert direction P. This pushing force is transferred from the main base 51 to the movable carrier 60 via the biased coil springs 95. The coil springs 95 may be pushed in when their defined threshold force is exceeded, which is monitored by means of the second sensors 96 or the third sensor 66. In the first function this compliance in the legs 71-76 is at least partly compensated by accordingly powering the electric motors 83 in order to be able to reach the proper final engagement position of the robot-side charging interface 100 with respect to the vehicle-side charging interface 20. The proper final engagement may be confirmed by the battery charger that is connected to the robot-side charging interface 100.

The second function is the determination of an unexpected physical contact between the robot-side charging interface 100 and the vehicle-side charging interface 20.

Figure 5C:
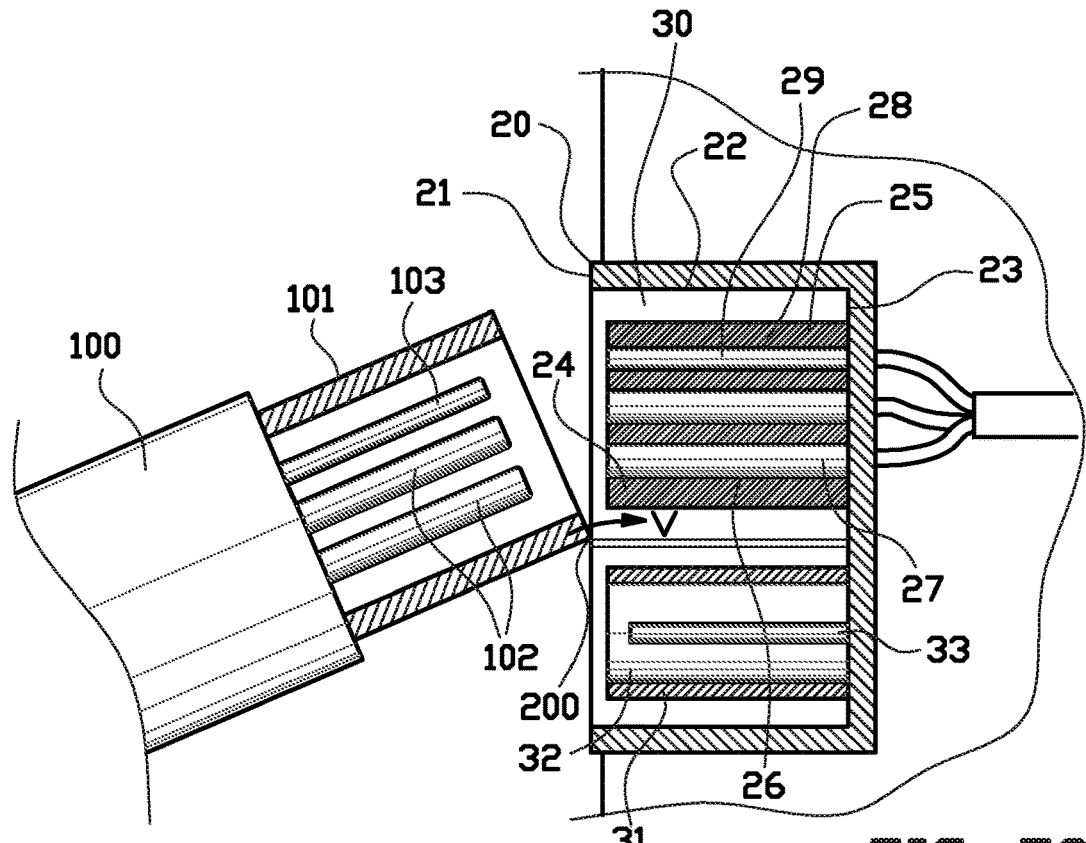
FIGS. 5C and 5D are partial cross sections of the robot-side charging interface and the vehicle-side charging interface during correction of an allowable misalignment under control of the robot.
Figure 5D:
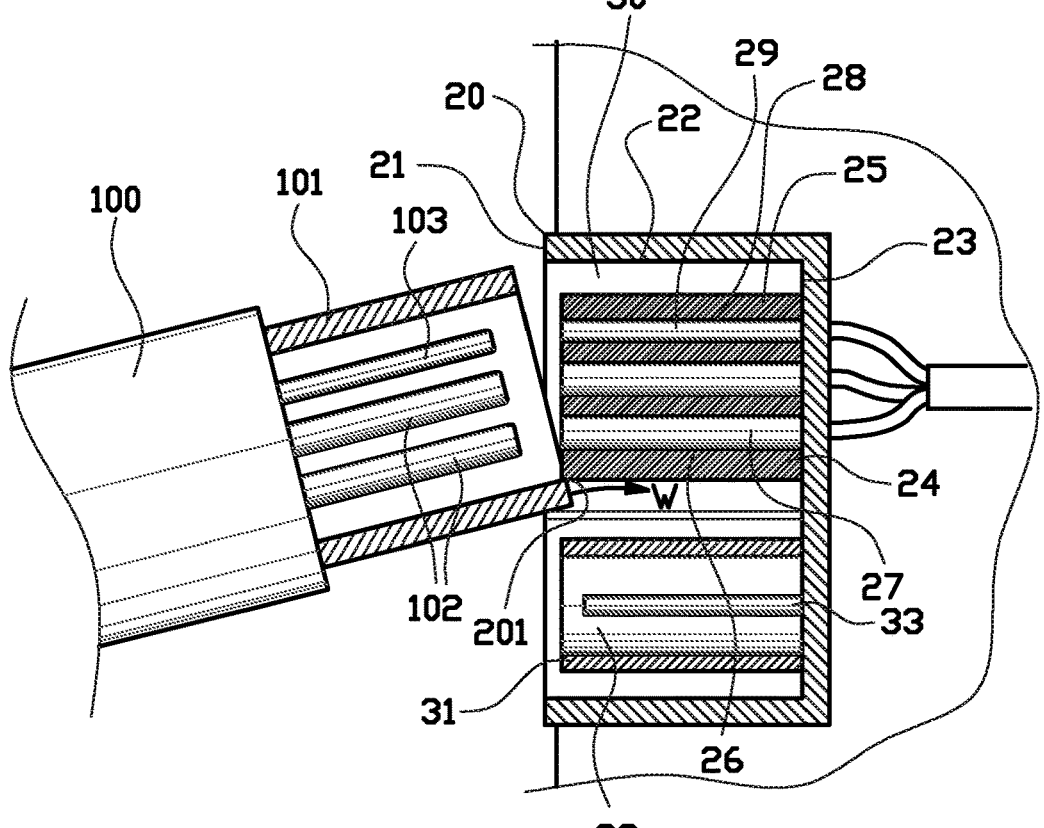

The third function is the determination of an acceptable misalignment of the robot-side charging interface 100 with respect to the vehicle-side charging interface 20, such as for example shown in FIG. 5C, due to an expected or unexpected first physical contact 200. This first physical contact 200 forces the robot-side charging interface 100 to tilt or slide with respect to the vehicle-side charging interface 20 while a pushing force is transferred from the main base 51 to the movable carrier 60 via the biased coil springs 95. The coil springs 95 may be pushed in when their defined threshold force is exceeded, which is monitored by means of the second sensors 96 or the third sensor 66. The compliance as provided by the individual coil springs 95 may induce a sliding movement of the robot-side charging interface 100 in direction V along the vehicle-side charging interface 20 by their self-searching shape features, and/or a corrective activation of the electric motors 83 is determined based on the signals of the second sensors 96 or third sensor 66. In FIG. 5C the illustrated misalignment contains a translation and a rotation in the same plane. It will be clear that any misalignment in all six degrees of freedom can occur, can be detected and corrected by corresponding corrective actions of the electric motors 83. This is repeated until the proper final engagement position of the robot-side charging interface 100 with respect to the vehicle-side charging interface 20 is reached. In this iteration a further physical contact 201 as shown in FIG. 5D may be detected and corrected by inducing a sliding movement in direction W. The electronic control system may monitor the electrical connections with the connectors of the robot-side charging interface, for example via the battery charger, to determine a misalignment, for example by determining a contact sequence or by detecting any deviations from the default contact sequence.

In an seventh step 370, the engaged robot-side charging interface 100 and vehicle-side charging interface 20 are locked to prevent disengagement, and the vehicle 2 is charged via the properly engaged charging interfaces 20, 100.

After charging, the charging interfaces 20, 100 are unlocked and robot-side charging interface 100 is disengaged from the vehicle-side charging interface 20 in an eighth step 380 by retracting the drive rods 82 of the legs 71-76. The drive rods 82 are fully retracted to retract the robot-side charging interface 100 to said standby position.

The specific compliance as provided by the parallel compliance assemblies 90 has the following advantages:

Firstly, the compliance enables safe detection of any expected or unexpected physical contact, for example a collision with a human, when the robot-side charging interface 100 is moved into its initial spatial position with respect to the vehicle-side charging interface 20. The compliance provides softness or flexibility when hitting the robot-side charging interface 100.

Secondly, the compliance allows the detection of any misalignment between the robot-side charging interface 100 and the vehicle-side charging interface 20 after the initial spatial position and orientation have been reached. The misalignment is derived from the detected physical contact. The compliance facilitates to rapidly obtain the proper final engagement position using the self searching shape features of the robot-side charging interface 100 and vehicle-side interface 20. The compliance makes the physical contact itself safer as damaging peak forces are prevented by the provided resilience or compliance.

Thirdly, the compliance facilitates the disengagement of the robot-side charging interface 100 from the vehicle-side charging interface 20, in particular when the position of the vehicle 10 has changed during the charging process.

Fourthly, the compliance absorbs any rigid motion as imposed by the rectilinear motion actuators 80 or by small movements of the vehicle 10. These small movements may be caused for example by passengers that step in or out of the vehicle 2, or by wind acting against the vehicle 2.

The compliance assemblies 90 therefore provide tactile feedback in the six degrees of freedom of movement of the moveable carrier 60 and therefore from the vehicle-side charging interface 100. This tactile feedback is derived from the third sensor 66 or the second sensor 96 and it is used by the electronic controller in controlling the rectilinear movement actuators 80. The vision system provides visual feedback.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. Charging infrastructure comprising
a charging station for charging a vehicle having a vehicle-side charging interface, wherein the charging station comprises
a robot that carries a robot-side charging interface for establishing a charging connection with the vehicle-side charging interface, wherein the robot comprises
a base frame,
a moveable carrier carrying the robot-side charging interface,
characterized by
at least three displacement assemblies between the base frame and the moveable carrier that form a mechanism to move the moveable carrier with at least three degrees of freedom with respect to the base frame, wherein
each displacement assembly comprises an actuator that is configured for
imposing a displacement between the base frame and the moveable carrier over a displacement stroke or
imposing a rotation of the moveable carrier with respect to the base frame over a displacement angle,
and wherein the robot comprises
at least one compliance assembly in series with each actuator and the robot-side charging interface for facilitating a disengagement of the robot-side charging interface from the vehicle-side charging interface, when a position of the vehicle has changed during a charging process or for absorbing a motion as imposed by a rectilinear motion of the actuator or by a movement of the vehicle,
wherein the at least one compliance assembly is configured for
absorbing or releasing a displacement between the actuator and the robot-side charging interface over a compliance stroke or for
absorbing or releasing a rotation of the moveable carrier with respect to the base frame over a compliance rotation,
wherein the length of the compliance stroke is at least 5 millimeter, or wherein the angle of the compliance rotation is at least 1 degree.

2. Charging infrastructure according to claim 1, wherein the robot comprises six displacement assemblies that form a hexapod mechanism between the base frame and the moveable carrier to move the moveable carrier with six degrees of freedom.

3. Charging infrastructure according to claim 1, wherein the displacement assemblies comprise the compliance assembly in series with the actuator between the robot-side charging interface and the moveable carrier.

4. Charging infrastructure according to claim 1, wherein the charging station comprises multiple compliance assemblies in series with the actuator and the robot-side charging interface, wherein these compliance assemblies have mutually different mechanical impedances that absorb or release the displacement between the actuator and the robot-side charging interface.

5. Charging infrastructure according to claim 1, wherein the displacement assemblies are at one side connected with the base frame via a first coupling and wherein the displacement assemblies are at an opposite side connected with the moveable carrier via a second coupling, wherein the actuator is a rectilinear motion actuator in series with the compliance assembly.

6. Charging infrastructure according to claim 5, wherein the first coupling and/or the second coupling is a universal joint.

7. Charging infrastructure according to claim 1, wherein the length of the compliance stroke is at least 50% of the displacement stroke.

8. Charging infrastructure according to claim 1, wherein the at least one compliance assembly is biased to a defined position between the actuator and the robot-side charging interface.

9. Charging infrastructure according to claim 1, wherein the at least one compliance assembly is configured for absorbing the displacement over the compliance stroke after exceeding a threshold load between the actuator and the robot-side charging interface.

10. Charging infrastructure according to claim 1, wherein the robot-side charging interface and the vehicle-side charging interface are provided with a locking provision to lock and unlock an established charging connection.

11. Charging infrastructure according to claim 1, wherein the charging station comprises an electronic control system for controlling the operation of the charging station, wherein
the electronic control system comprises an electronic controller that is connected with the actuator,
the electronic controller is configured for controlling the displacement imposed by each actuator,
the electronic control system comprises a sensor that is connected with the electronic controller for determining a position or a movement of the actuator, for determining the compliance stroke, and/or for determining a force or load acting on the at least one compliance assembly.

12. Charging infrastructure according to claim 11, wherein the electronic controller is configured for detecting the compliance stroke and for controlling the displacement imposed by the actuator in response to the detection of the compliance stroke.

13. Charging infrastructure according to claim 11, wherein the electronic control system comprises an imaging detector that is connected with the electronic controller, wherein the electronic controller is configured for
- determining a spatial position of the vehicle-side charging interface in the charging station, and for
- controlling the displacement imposed by the actuator accordingly to move the robot-side charging interface towards the vehicle-side charging interface for establishing the charging connection.

14. Charging infrastructure according to claim 11, comprising a computer server remote from the charging station that is connected with the electronic control system for configuration, or remote control, of the electronic controller.

15. Charging infrastructure according to claim 11, wherein the electronic controller is configured for determining a collision of the robot-side charging interface based on the displacement stroke and the compliance stroke.

16. Charging infrastructure according to claim 11, wherein the electronic controller is configured for determining a physical contact between the robot-side charging interface and the vehicle-side charging interface based on the displacement stroke and the compliance stroke.

17. Charging infrastructure according to claim 11, wherein the electronic controller is configured for determining a misalignment between the robot-side charging interface and the vehicle-side charging interface based on the displacement stroke and the compliance stroke.

18. Charging infrastructure according to claim 17, wherein the electronic controller is configured for controlling the displacement imposed by the actuator in order to at least partly correct the misalignment.

19. Charging infrastructure according to claim 11, wherein the electronic controller is configured for
- determining a spatial position of the robot-side charging interface in the charging station, and for
- controlling the displacement imposed by the actuator accordingly to move the robot-side charging interface towards the vehicle-side charging interface for establishing the charging connection.

* * * * *